(12) United States Patent
Wang

(10) Patent No.: US 7,295,185 B2
(45) Date of Patent: Nov. 13, 2007

(54) INPUT DEVICE WITH MULTI-DIRECTIONAL ROLLER ASSEMBLY

(75) Inventor: Wei-Chuan Wang, Taipei (TW)

(73) Assignee: Kye Systems Corporation, Taipei (TW)

(*) Notice: Subject to any disclaimer, the term of this patent is extended or adjusted under 35 U.S.C. 154(b) by 539 days.

(21) Appl. No.: 10/857,016

(22) Filed: Jun. 1, 2004

(65) Prior Publication Data

US 2005/0264520 A1 Dec. 1, 2005

(51) Int. Cl.
G09G 5/00 (2006.01)
H01H 9/00 (2006.01)

(52) U.S. Cl. .................. 345/164; 345/156; 345/163; 345/684; 200/4; 200/11 A

(58) Field of Classification Search ........ 345/156–169, 345/684–687; 348/734; 200/5 A, 6 A; 715/784–786; 463/37–38; 273/148 B
See application file for complete search history.

(56) References Cited

U.S. PATENT DOCUMENTS

| 5,530,455 A | 6/1996 | Gillick et al. ............... 345/163 |
| 6,075,518 A * | 6/2000 | Pruchniak .................... 345/157 |
| 6,555,768 B2 * | 4/2003 | Deruginsky et al. .......... 200/4 |
| 6,697,050 B1 * | 2/2004 | Shinohe et al. ............. 345/163 |
| 6,717,572 B1 * | 4/2004 | Chou et al. .................. 345/157 |
| 7,075,516 B2 * | 7/2006 | Bohn ........................ 345/163 |
| 7,082,323 B2 * | 7/2006 | Yang ....................... 455/575.1 |
| 2003/0025673 A1 | 2/2003 | Ledbetter et al. |
| 2005/0231463 A1 * | 10/2005 | Yang .......................... 345/156 |
| 2006/0109246 A1 * | 5/2006 | Lee et al. ................... 345/163 |

* cited by examiner

*Primary Examiner*—Lun-Yi Lao
(74) *Attorney, Agent, or Firm*—Bacon & Thomas, PLLC

(57) ABSTRACT

A multi-directional roller assembly for an input device includes a housing and a carrier supported within the housing. The carrier has a roller that can be rotated so as to scroll an image vertically on a display. The carrier can also be tilted left and right so as to execute a command or scroll the image on the display in a horizontal direction.

10 Claims, 7 Drawing Sheets

INPUT DEVICE WITH MULTI-DIRECTIONAL ROLLER ASSEMBLY

BACKGROUND OF THE INVENTION

1. Field of the Invention

The present invention relates to an input device, and in particular, to an input device with a multi-directional roller assembly for executing a command or scrolling an image on a display of a computer.

2. Description of the Prior Art

An input device, such as a computer mouse, usually has a left button to execute a command when locating the cursor at a specific position, and a right button to activate an extra function block on the screen. In addition, many peripheral devices, including computer mouses, keyboards, trackballs, game controllers, and so forth, have an additional scrolling roller for scrolling images on a display without the need to position a cursor. However, the progressive price reductions of such devices in recent years has made it extremely difficult to make a profit on such devices, and therefore control of costs has become critical. The invention proposes to control costs by eliminating the buttons, and instead providing a roller assembly that carries out the functions of the button and in addition serves as a scroll wheel, and yet has a very simple structure.

The most known related skill for scrolling images in WINDOWS™ applications is disclosed in U.S. Pat. No. 5,530,455, which shows a roller on the top of a mouse for vertically scrolling a content of a WINDOWS™ application. This roller is used solely for scrolling and cannot replace the conventional buttons used for executing commands or activating extra function blocks. Furthermore, use of the scroll wheel is limited to vertical scrolling if a user wishes to scroll the content differently, the user has to additionally press a Shift key on a keyboard and then rotate the roller to scroll the content horizontally. Alternatively, if the user is willing to spend more energy of movement to move the cursor to the horizontal scrolling bar and rotate the roller or draw the scrolling bar, then the user can scroll the image horizontally without using the shift key on the keyboard.

In order eliminate the need to press the shift key to achieve horizontal and vertical scrolling, U.S. Published Patent Application No. 2003/0025673 discloses a roller assembly which can be rotated for scrolling the image vertically (in an x-axis direction), or tilted to scroll the image horizontally (in a y-axis direction). This type of roller has the disadvantage that an optical encoder must be positioned within the roller assembly so as to detect the rotation of the roller in order to scroll the image in the y-axis direction. Due to the complex structure disclosed in the patent publication, the roller assembly has a very high cost, not only due to the need for precisely produced components, but also because of the difficulty of assembling the components of the roller.

SUMMARY OF THE DISCLOSURE

It is accordingly a first objective of the present invention to provide a simple input device that does not require buttons to be located on the housing, and yet that is capable of carrying out the functions of the conventional buttons, including executing commands when locating a cursor, and activating extra function blocks.

It is a second objective of the invention to provide an input device in which the functions that would otherwise be carried out by buttons on the housing of the input device are carried out by a scroll wheel including a simple and easy-to-assemble roller assembly.

It is yet another object of the present invention to provide an efficient and easy-to-assemble roller assembly to control the scrolling of the image both in x and y axis directions.

These objectives are achieved, in accordance with the principles of a preferred embodiment of the invention, by providing an input device that is made up solely of a housing, a printed circuit board (PCB), and a roller assembly. The roller assembly is connected to an encoder that detects rotation of the roller to accomplish vertical scrolling, and is arranged to activate a first switch when pressed downwardly, and second and third switches when tilted to the left or right, to either carry out horizontal scrolling or to execute commands or activate function blocks in the manner of the left and right buttons of a conventional mouse. When the roller is rotated, the second central axle will force the encoder to generate a first electric signal that controls the scrolling; and when the roller is tilted, the roller, the first central axle and the carrier will pivot relative to the second central axle so as to generate a second electric signal, that depending on the direction of tilt, causes left or right scrolling or carries out other functions of a mouse.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
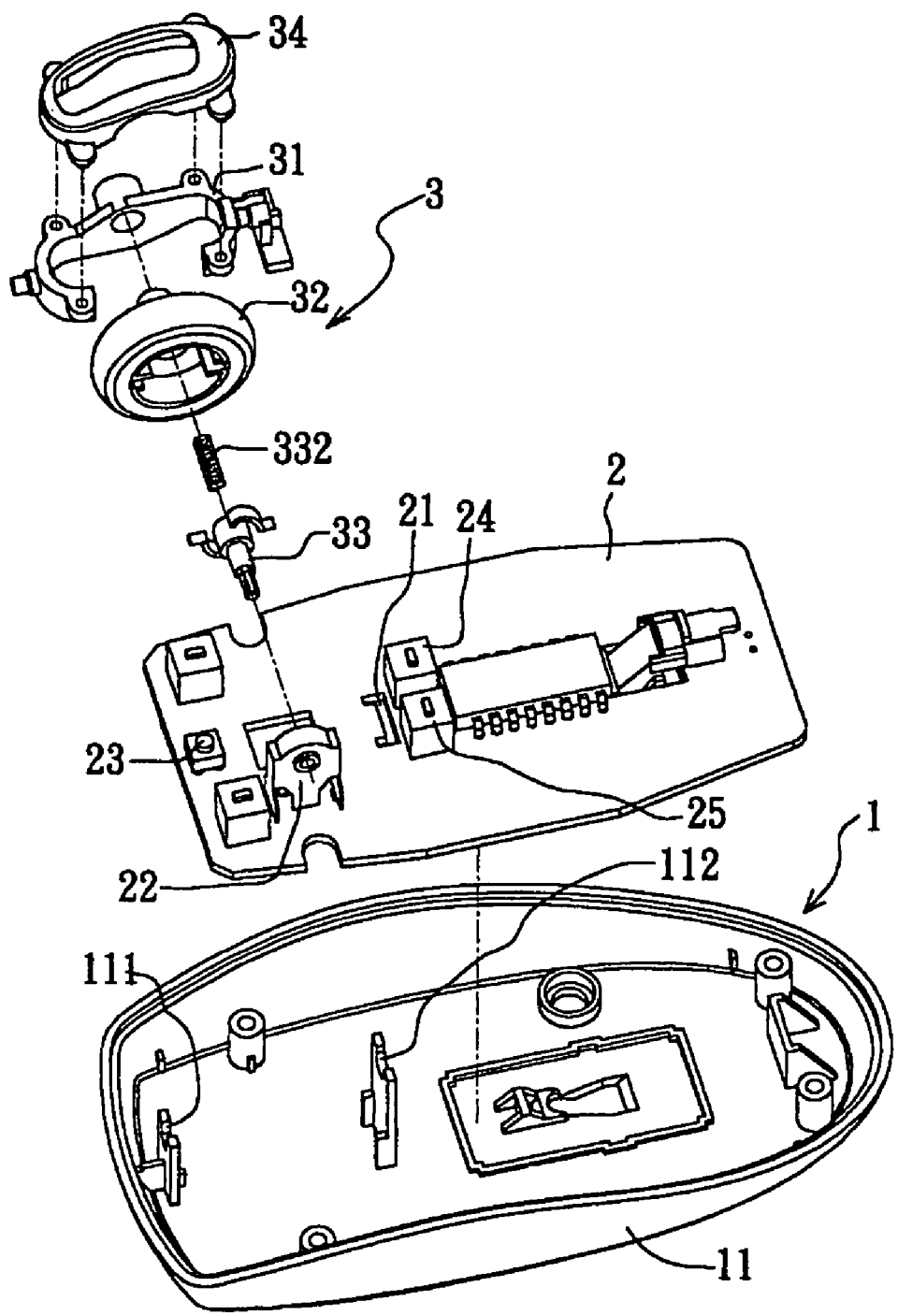
FIG. 1 is an exploded view of the present invention.
Figure 2:
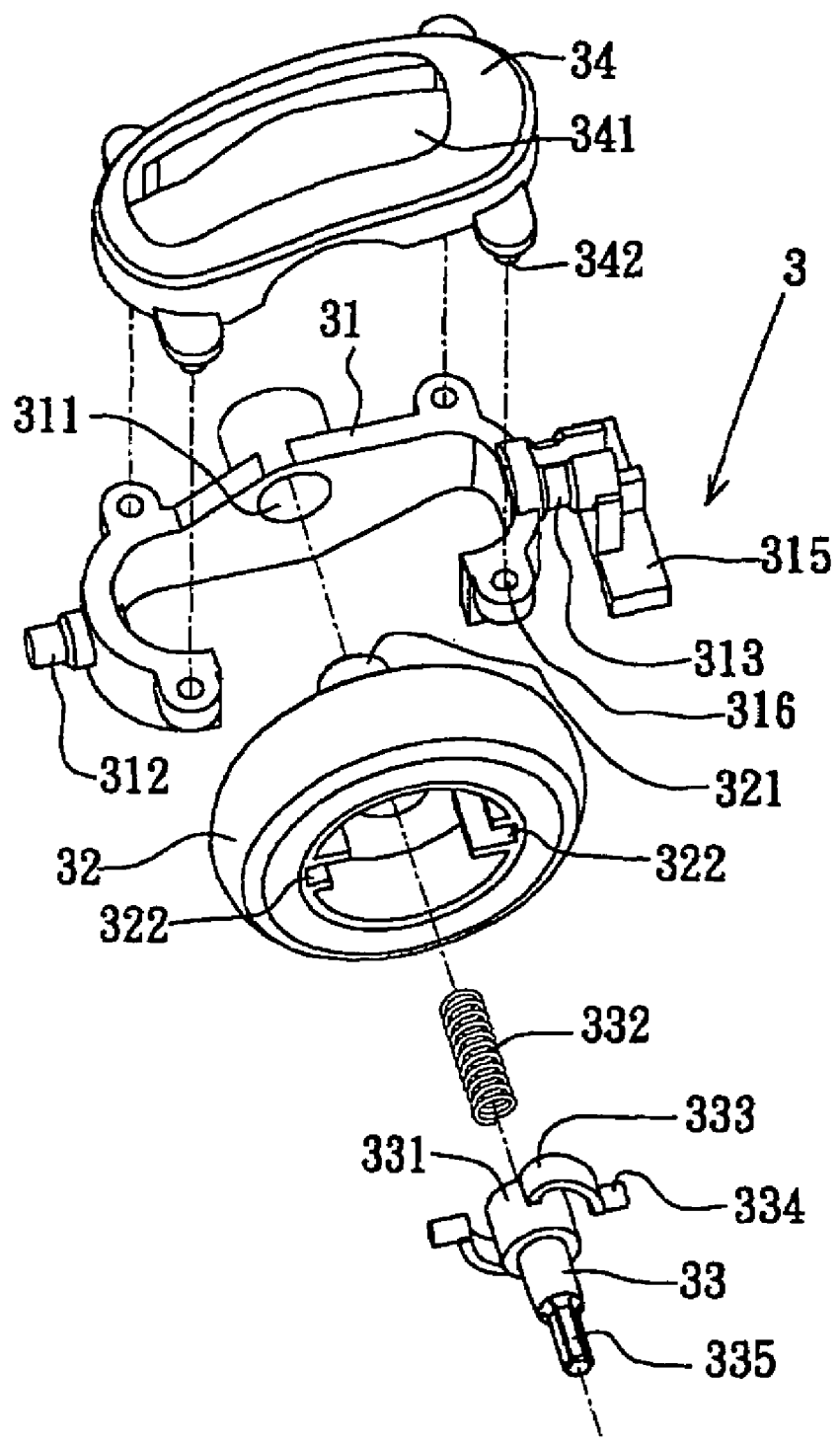
FIGS. 2, 2a, 2b are an exploded views of the roller assembly.
Figure 3:
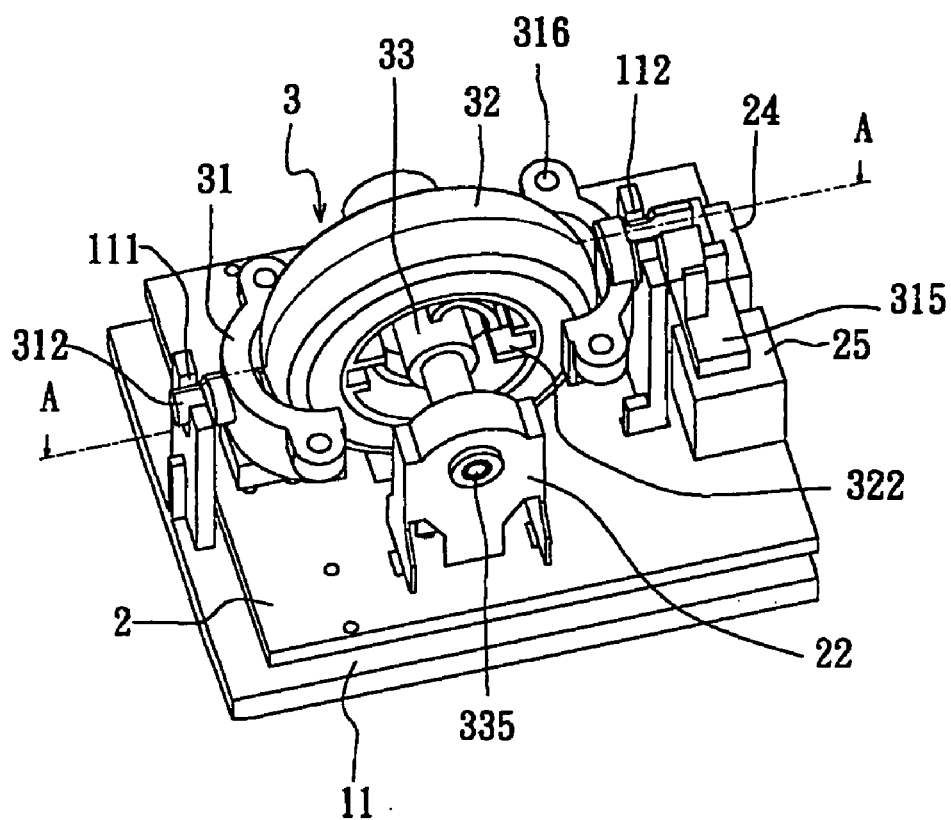
FIG. 3 is a perspective view of the first embodiment according to the present invention.

Referring to FIGS. 1~3, an input device, such as but not limited to a computer mouse, trackball, tablet, personal digital assistant (PDA), keyboard, game controller, and so forth, is made up of a housing 1, a PCB 2 and a roller assembly 3. The lower housing 11 has a supporting unit which includes a first support 111 and a second support 112, for retaining the roller assembly 3.

The first and second support 111 and 112 extend through an opening 21 to hold the roller assembly 3 at a position relative to the PCB such that an encoder 12, and first, second, and third switches 23, 24, 25 situated on the PCB are also located near the roller assembly 3.

The roller assembly 3 mainly consists of a carrier 31, a roller 32 and a second central axle 33. A portion of the roller 32 is exposed to the outside of the housing 1 through a top opening (not shown). The carrier 31 has a sleeve 311 extending from a lateral side, a first extension axle 312 at a front end, and a second extension axle 313 at a rear end. The first and second extension axles 312 and 313 are respectively held up by the first and second supports 111 and 112. Referring to FIG. 2a, a protrusion 314 is positioned under the first extension axle 312, and an arm 315 extends down from the second extension axle 313. The arm 315 has two ends which are correspondingly positioned over the second and third switches 24 and 25.

The roller 32 is a wheel-like component which has a first and second lateral side. The roller 32 has a hollow first central axle 321 extending from the first lateral side. The sleeve 311 can receive the first central axle 321, allowing the roller 32 to be unboundedly rotated thereon. The second lateral side of the roller 32 has two grooves 322 for receiving one end of a second central axle 33.

Figure 2B:
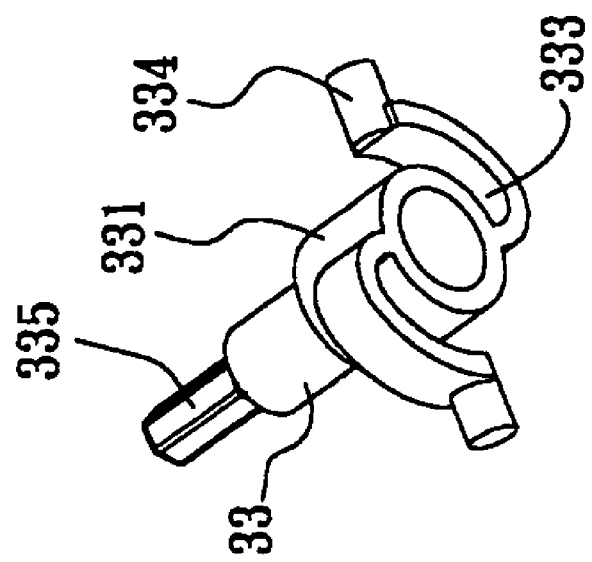
Figure 2A:
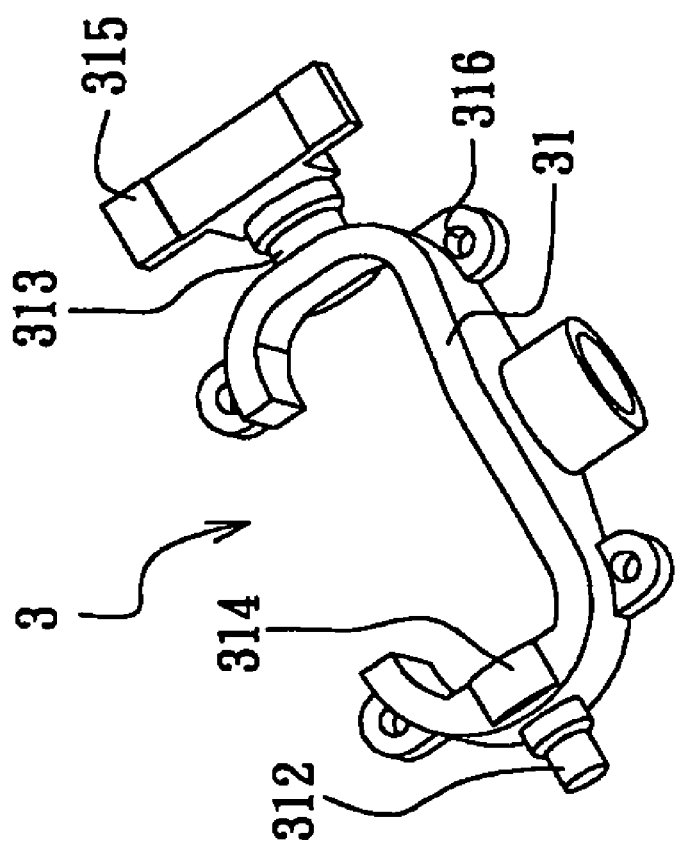

Referring to FIG. 2b, the second central axle 33 has a hollow cylinder 331 at one end and a wedge 335 at other end. Two flexible clasps 333 extend from the cylinder 331, and each of the clasps has a round end 334. Therefore, the grooves 322 can receive a corresponding clasp 333 therein, and a resilient element 332 can be positioned within the hollow first central axle 321 and the hollow cylinder 331. The wedge 335 is coupled to the encoder 22.

Figure 4:
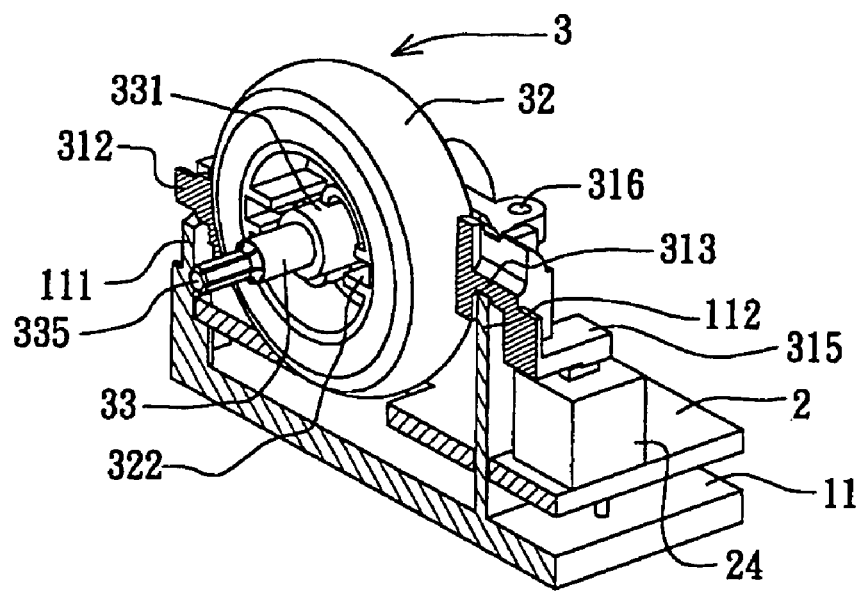
FIG. 4 is a sectional view of taken along line A-A in FIG. 3.
Figure 5:
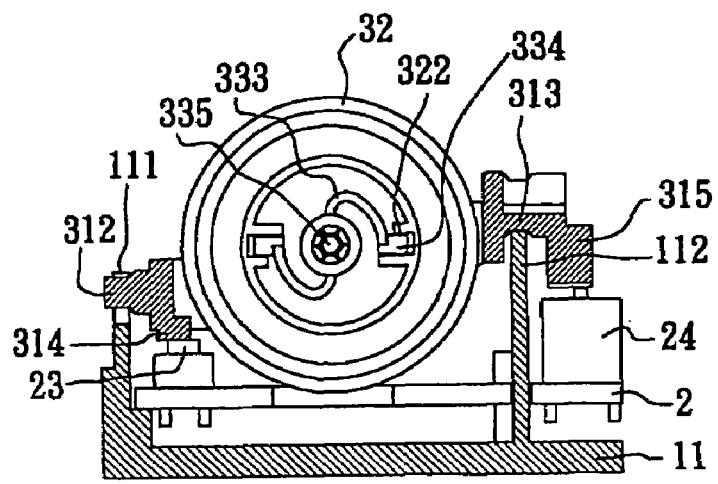
FIGS. 5-7 are lateral views of the cross-section of FIG. 4.

Referring to FIGS. 3, 4 and 5, the carrier 31 is retained between the first and second supports 111 and 112, but the roller assembly 3 is actually supported by the second central axle 33 and the second support 112 such that a gap is formed between the first extension axle 312 and the first support 111. Therefore, the first extension axle 312 is moveable up and down in an opening (not shown) of the first support 111. In addition, the first switch 23 is positioned beneath the protrusion 314, and each round end 334 of the flexible clasps 333 is just positioned within the groove 322. Also each end of the arm 315 is correspondingly positioned just above the second and third switches 24 and 25.

Figure 6:
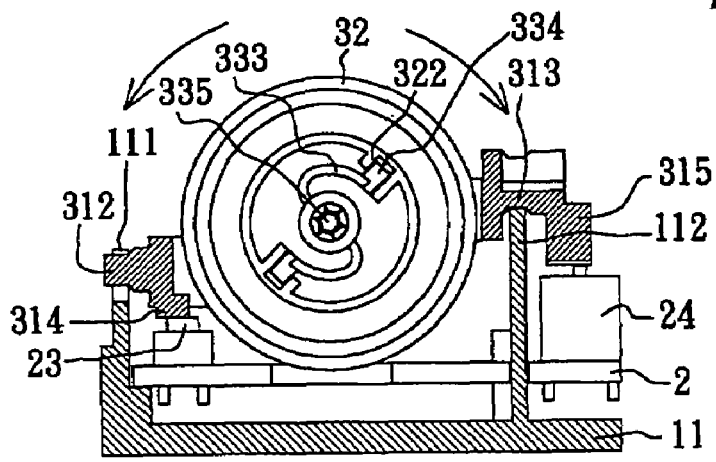
Figure 7:
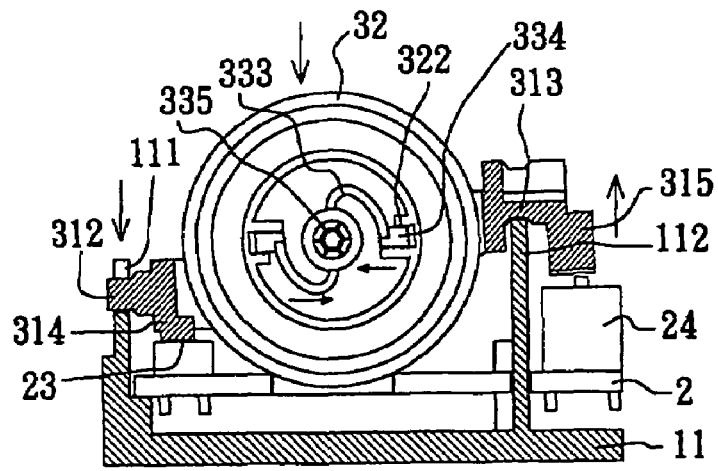

Referring to FIGS. 6 and 7, when a user rotates the roller 32, the clasps 333 will force the second central axle 33 to be turned correspondingly such that the encoder 22 will detect the angle and direction of the roller 32 so as to scroll a windows application. When the user presses down the roller 32, the first extension axle 312 will be forced to move down in the opening of the first support 111. Please notice that in order to reduce the effect on the encoder of the downward movement of the roller 32 (i.e. a torque applied toward the encoder 22), the clasps 333 will be slightly forced to move toward the second central axle 33.

Figure 8:
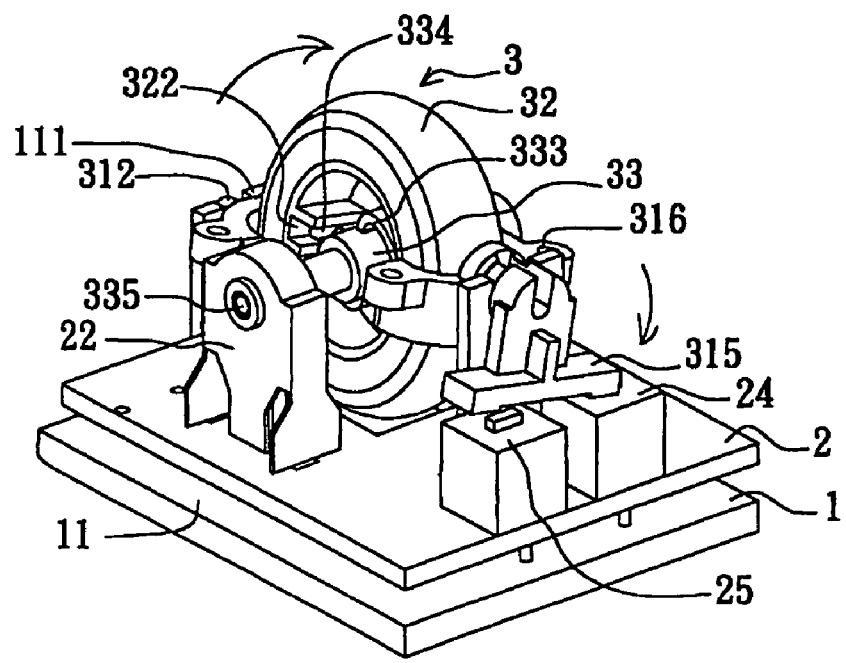
FIGS. 8-9 are perspective views when the roller assembly is tilted to the right and left.
Figure 9:
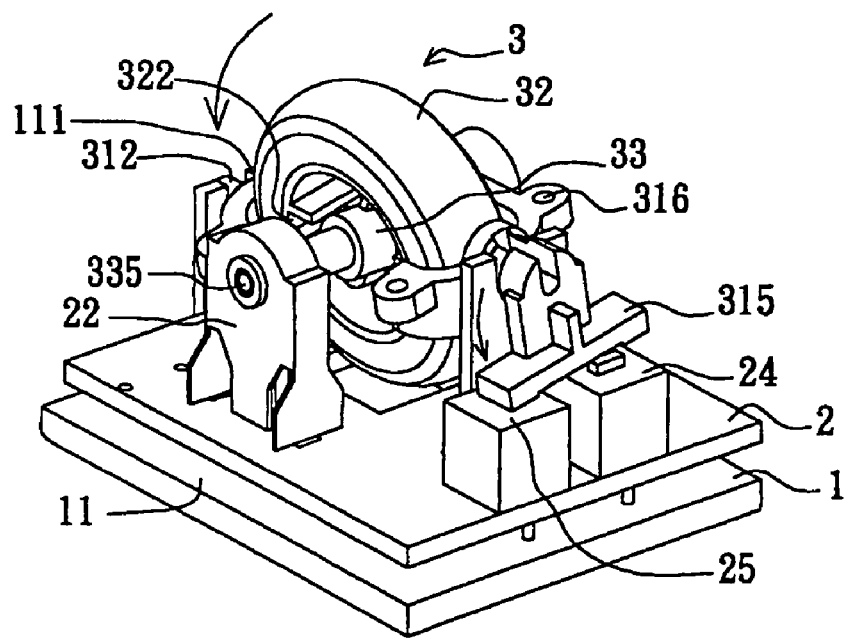

Referring to FIGS. 8 and 9, when the user tilts the roller 32 to the right, the first central axle 321 will force the carrier 31 to tilt in a rightward direction accordingly such that one end of the arm 315 will move downwardly activate the second switch 24 so as to open an extra function block or horizontally scroll the windows application to the right. On the other hand, when the user tilts the roller 32 to the left, the first central axle 321 will force the carrier 31 to tilt in a leftward direction such that the other end of the arm 315 will move downwardly to activate the third switch 25 so as to execute a command or horizontally scroll the windows application to the left.

Figure 10:
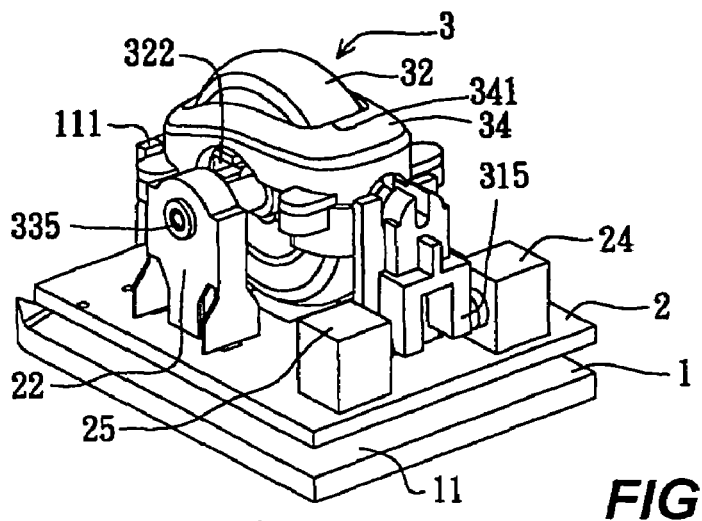
FIG. 10 is a perspective view of the second embodiment according to the present invention.
Figure 11:
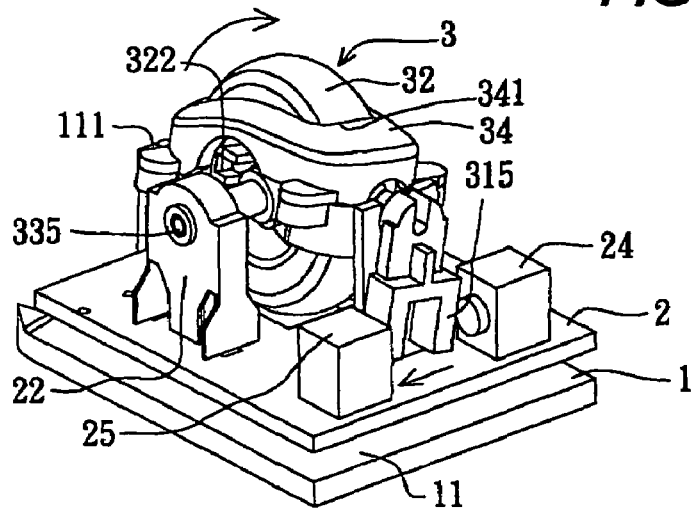
FIGS. 11-12 are perspective views when the roller assembly is tilted to the right and left.
Figure 12:
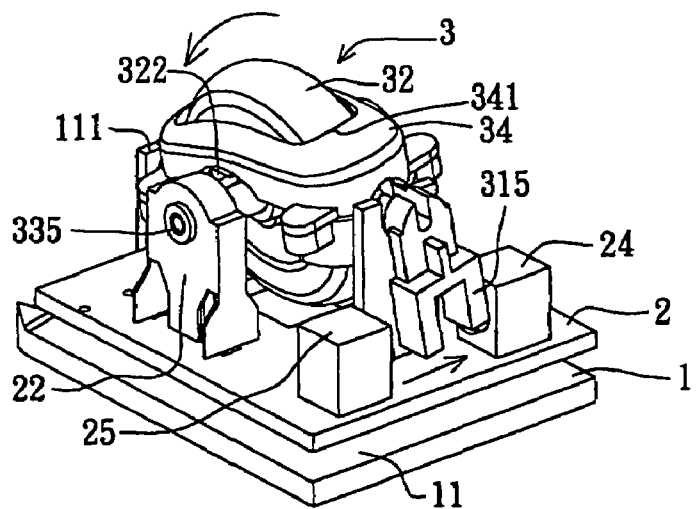

FIGS. 10~12 is the second embodiment according to the present invention. The main difference is that each end of the arm 315 is located between the second and third switch 24 and 25. When the user tilts the roller 32 to the right, the first central axle 321 will force the carrier 31 to tilt right accordingly such that one end of the arm 315 will laterally activate the second switch 24 so as to open an extra function block or horizontally scroll the windows application to the right. When the user tilts the roller 32 to the left, the first central axle 321 will force the carrier 31 to tilt left accordingly such that the other end of the arm 315 will laterally activate the third switch 25 so as to execute a command or horizontally scroll the windows application to the left.

Referring to FIGS. 1 and 2, cover 34 has a plurality of wedges 342, and the carrier 31 correspondingly includes a plurality of holes 316 such that the cover 34 is able to couple to the carrier 31, thus enabling the roller 32 to extend through the opening 341 of the cover 34. The purpose of the cover 34 is to lower the clearance between the roller 32 and a top opening (not shown) of the housing 11.

By the structure mentioned above, the present invention not only provides a simple input device without the buttons located on the housing, but also the present invention further can provide an efficient and easy-to-assemble roller assembly to control the scrolling of the image both in x and y axle directions. While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An input device with roller, comprising:
a tiltable carrier sustained by a supporting unit; and
a rotatable roller positioned on the carrier, wherein the roller has a first central axle at a first lateral side which couples to the carrier; and the roller has a second central axle at a second lateral side which couples to an encoder;
wherein said roller and carrier are tiltable relative to the second central axle,
wherein said first central axle is arranged to tilt with the roller and carrier relative to the second central axle, and wherein:
when the roller is rotated, the second central axle will rotate and force the encoder to generate a first electric signal; and
when the roller is tilted, the roller, the first central axle and the carrier will pivot relative to the second central axle so as to generate a second electric signal.

2. The input device as claimed in claim 1, wherein an arm is extending from the carrier so as to active at least a switch to generate the second electric signal.

3. The input device as claimed in claim 1, wherein a protrusion is extending from the carrier so as to active a switch to generate a third electric signal while the roller is pressed down.

4. The input device as claimed in claim 3, wherein the supporting unit has a first and a second support, and the carrier correspondingly has a first extension axle and a second extension axle such that the roller is sustained therebetween; the first support having an opening such that the first extension axle of the carrier is movable in the opening.

5. The input device as claimed in claim 1, wherein the second central axle has at least a pair of flexible clasps which couple to the second lateral side of the roller such that the roller is tiltable over the clasps.

6. The input device as claimed in claim 5, wherein each of the clasps has a round end.

7. The input device as claimed in claim 1, wherein a resilient element is located between the first and second central axle.

8. The input device as claimed in claim 7, wherein the first and the second central axles are hollow, and the resilient element is received therein.

9. The input device as claimed in claim 1, wherein the carrier is coupled to a cover.

10. The input device as claimed in claim 1, wherein the carrier has a sleeve for receiving the first central axle.

* * * * *